United States Patent [19]

Kolb

[11] Patent Number: 5,916,516
[45] Date of Patent: Jun. 29, 1999

[54] FLUORIDATED ELECTRODE MATERIALS AND ASSOCIATED PROCESS FOR FABRICATION

[75] Inventor: Eric S. Kolb, Acton, Mass.

[73] Assignee: Mitsubishi Chemical Corporation, Tokyo, Japan

[21] Appl. No.: 09/025,693

[22] Filed: Feb. 18, 1998

[51] Int. Cl.$^6$ ...................................................... H01M 6/00
[52] U.S. Cl. ........................ 29/623.5; 429/218; 429/223; 429/224; 429/248
[58] Field of Search ..................................... 429/218, 223, 429/224, 233, 248, 122; 29/623.5

[56] References Cited

U.S. PATENT DOCUMENTS 5,674,645  10/1997  Amatucci et al. ...................... 429/224

*Primary Examiner*—Bruce F. Bell
*Attorney, Agent, or Firm*—Factor and Shaftal

[57] ABSTRACT

An electrode for use in an electrolytic cell, and, an electrolytic process, wherein the electrode includes an electrode active material having at least one partially inorganically fluoridated surface to, in turn, increase at least one of stability, capacity, and rate capacity of the electrode. The fluoridation can be carried out by atmospherically controlled plasma treatment.

9 Claims, 5 Drawing Sheets

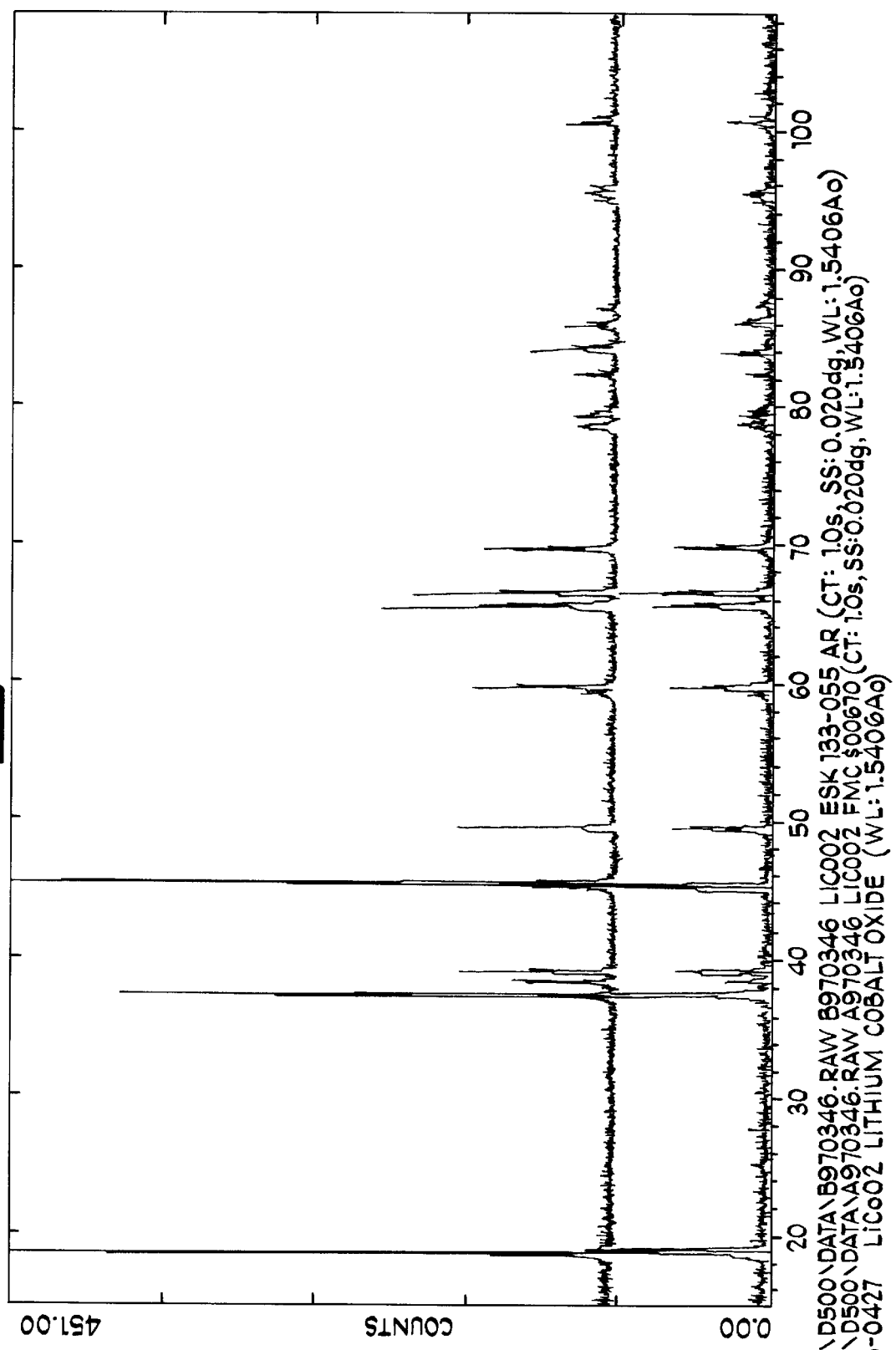

ATOMIC CONCENTRATION OF LiCoO2 SAMPLE SURFACES (XPS)

| ELEMENT | | SAMPLE #1A (NO PLASMA) (BEFORE H2O WASH) | SAMPLE #2 (Ar PLASMA) (BEFORE H2O WASH) | SAMPLE #3A (Ar+O2 PLASMA) (BEFORE H2O WASH) |
|---|---|---|---|---|
| C1s | TOTAL | 23.3 | 22.8 | 25.8 |
| | C-C,C-H (284.6eV) | 16.7 | 11.0 | 15.6 |
| | C-O (285.9eV) | 3.3 | 8.9 | 6.9 |
| | C=O (287.3-287.9eV) | 1.1 | 1.6 | 1.4 |
| | COOR (289.2-289.4eV) | 2.3 | 1.2 | 2.0 |
| | | 1.1 | 1.3 | 1.6 |
| O1s | TOTAL | 39.8 | 32.2 | 33.4 |
| | 529eV-COMPONENT | 21.2 | 10.2 | 13.3 |
| | OTHERS (INCLUDING ORG.) | 18.5 | 22.0 | 20.1 |
| | | 1.9 | 1.9 | 2.1 |
| Co3p Co2p | TOTAL | 21.4 | 16.9 | 15.9 |
| | TOTAL | 100 | 100 | 100 |
| | COMPONENT AS IN #1A (*) | 100.0 | 60.7 | 81.3 |
| | OTHERS | 0.0 | 39.3 | 18.7 |
| Li1s | TOTAL | 14.9 | 17.7 | 18.2 |
| | COMPONENT AS IN #1A (*) | 14.9 | 8.3 | 11.4 |
| | OTHERS | 0.0 | 9.4 | 6.8 |
| | | 0.7 | 1.0 | 1.1 |
| Ca2p | | 0.6 | 0.6 | 0.7 |
| F1s | | 0.0 | 9.7 | 6.0 |
| | | 0.0 | 0.6 | 0.4 |
| | | (ATOMIC %) | (ATOMIC %) | (ATOMIC %) |

(*) IT IS CONSIDERED TO BE ORIGINATED PARTLY FROM PURE LiCoO2 AND PARTLY FROM SOME OTHER SPECIES WITH LOWER Li/Co RATIO.

FLUORIDATED ELECTRODE MATERIALS AND ASSOCIATED PROCESS FOR FABRICATION

BACKGROUND OF THE INVENTION

1. Field of the Invention

The present invention relates in general to electrode materials, and more particularly, to electrode materials having fluoridated surfaces which increase the electrochemical performance of the electrode and associated electrolytic cell. The invention is also directed to a process for fabricating fluoridated electrode materials for use in an electrolytic cell.

2. Background Art

Lithium ion batteries have been known in the art for several years. Moreover, lithium ion batteries having electrodes which utilize conventional untreated lithium transition metal oxides, such as $LiCoO_2$, $LiNiO_2$, and $LiMn_2O_4$ are likewise well known. While such batteries have been readily utilized in the industry, they remain marginally adequate for commercial use by today's standards. In particular, electrodes utilizing conventional lithium transitions metal oxides exhibit reasonable stability and capacity at relatively low charge/discharge rates. However, at higher charge/discharge rates batteries utilizing such conventional electrode materials suffer from capacity loss and/or material degradation. As such, the prior art is replete with references which are directed towards maximizing the capacity and stability of lithium ion batteries at elevated charge/discharge rates.

Nevertheless, the prior art is void of any disclosure relative to using an organic precursor to inorganically fluoridate electrode active materials, to in turn, increase the electrochemical performance of an associated electrolytic cell.

SUMMARY OF THE INVENTION

The present invention is directed to an electrode for use in an electrolytic cell comprising: a) a current collecting substrate, and b) an electrode active material having at least one surface, wherein the at least one surface is at least partially inorganically fluoridated from an organic precursor, preferably a fluorinated polymer to, in turn, increase at least one of stability, capacity and rate capacity of the electrode.

In a preferred embodiment the electrode active material having at least one surface is at least partially inorganically fluoridated via plasma treatment. In this embodiment the plasma treatment may occur in either an inert control atmosphere or an inert/non-inert atmospheric mixture.

In another preferred embodiment the electrode active material is selected from at least one of the group of transition metal oxides and lithium transition metal oxides. In this embodiment the lithium transition metal oxides may be selected from at least one of the group of $LiCoO_2$, $LiNiO_2$, and $LiMn_2O_4$, or a mixture of lithiated TMO, such as $LiCo_xNi_yO_2$ where x+y=1.

The present invention is also directed to an electrolytic cell comprising an electrolyte, a first electrode, and a second electrode, wherein at least one of the first and second electrodes comprises: a) a current collecting substrate; and b) an electrode active material having at least one surface, wherein the at least one surface is at least partially inorganically fluoridated from an organic precursor, preferably a fluorinated polymer to, in turn, increase at least one of stability, capacity and rate capacity of the electrode.

In another preferred embodiment the electrode active material having at least one surface is at least partially fluoridated via plasma treatment. In this embodiment the plasma treatment occurs in either an inert control atmosphere or an inert/non-inert atmospheric mixture.

In yet another embodiment of the invention, the electrode active material is selected from at least one of the group of transition metal oxides and lithium transition metal oxides. In this embodiment the lithium transition metal oxides may be selected from at least one of the group of $LiCoO_2$, $LiNiO_2$, and $LiMn_2O_4$ or a mixture of lithiated TMO, such as $LiCo_xNi_yO_2$ where x+y=1.

The present invention is also directed towards a process for fluoridating at least a portion of at least one surface of an electrode active material for use in an electrolytic cell comprising the steps of: a) positioning at least a portion of the electrode active material having at least one surface into a chamber; b) introducing at least one fluoridated substance into the chamber; c) associating at least a portion of the at least one surface of the electrode active material with the introduced at least one fluoridated substance to, in turn, increase at least one of stability, capacity and rate capacity of the electrode active material.

In a preferred embodiment the step of associating includes exposing at least a portion of the at least one surface of the electrode active material and the at least one fluoridated substance to plasma treatment. In this embodiment the plasma treatment may occur in either an inert control atmosphere or an inert/non-inert atmospheric mixture.

In another preferred embodiment the electrode active material is selected from the group of transition metal oxides and lithium transition metal oxides. In this embodiment, the lithium transition metal oxides are selected from at least one of the group of $LiCoO_2$, $LiNiO_2$ and $LiMn_2O_4$ or a mixture of lithiated TMO, such as $LiCo_xNi_yO_2$ where x+y=1.

The present invention is also directed to a process for fluoridating at least a portion of at least one surface of an electrode active material for use in an electrolytic cell comprising the steps of: a) positioning at least a portion of the electrode active material having at least one surface into a chamber associated with a plasma generator; b) introducing at least one organic fluoropolymer into said chamber; c) activating the plasma generator; d) controllably decomposing at least a portion of the organic fluoropolymer; and e) inorganically associating at least a portion of the decomposed fluoropolymer with at least a portion of the at least one surface of the electrode active material to, in turn, increase at least one of stability, capacity and rate capacity of the electrode active material.

In a preferred embodiment the fluoropolymer is a fluorinated ethylene-propylene copolymer (i.e. FEP); of course, other polymers, such as tetrafluoropolyethylene, among others will also work.

BRIEF DESCRIPTION OF THE DRAWINGS

FIG. No. 1 of the drawings is a cross sectional view of a prior art electrode;

FIGS. No. 2 of the drawings is a fragmented cross sectional view of a prior art electrode showing its surface characteristics;

Figure 1:
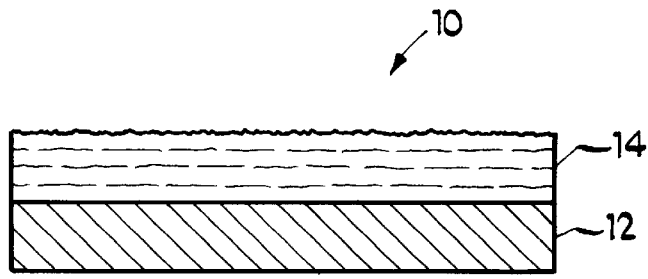

FIGS. No. 3 of the drawings is a cross sectional view of the electrode according to the present invention;

FIG. No. 4 of the drawings is a fragmented cross sectional view of the electrode according to the present invention showing its surface characteristics;

FIG. No. 5 of the drawings is a voltage/capacity two-dimensional plot showing the rate capacities of both untreated and plasma induced fluoridated electrode materials at a (C/2) charge/discharge rate;

FIG. No. 6 of the drawings is a capacity/cycle number two-dimensional plot showing the capacities of both untreated and plasma induced fluoridated electrode materials at a charge/discharge rates of (C) and (C/2), respectively;

FIG. No. 7 of the drawings is a capacity/cycle number two-dimensional plot showing the capacities of both untreated and plasma induced fluoridated electrode materials at a charge/discharge rates of (C/4);

FIG. No. 8 of the drawings is an x-ray diffraction trace comparing unmodified $LiCoO_2$ to plasma induced fluoridated $LiCoO_2$; and FIG. No. 9 of the drawings is an x-ray photo spectrogram report quantitatively showing the % fluoridation of the electrode surface.

DETAILED DESCRIPTION OF THE DRAWINGS

While this invention is susceptible of embodiment in many different forms, there is shown in the drawings and will herein be described in detail specific embodiments with the understanding that the present disclosure is to be considered as an exemplification of the principles of the invention and is not intended to limit the invention to the embodiments illustrated.

Prior art electrode 10 is shown in FIG. 1 as including current collector 12, and paste layer, or electrode paste layer (herein after "electrode layer") 14.

Figure 2:
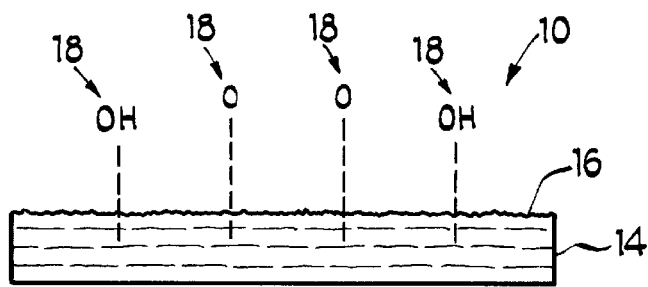

As shown in FIG. 2, electrode layer 14 includes surface 16 and atomic/molecular species 18. Atomic/molecular species 18 which conventionally comprises anionic oxygen atoms (oxides) and/or molecular hydrogenated oxygen atoms (hydroxides), extend contiguously from surface 16. Such an atomic/molecular surface configuration readily decomposes during cell charging and discharging of prior art electrode 10—especially at higher charge/discharge rates. It has been observed that this decomposition leads to poor cell stability, capacity, and rate capacity characteristics.

Figure 3:
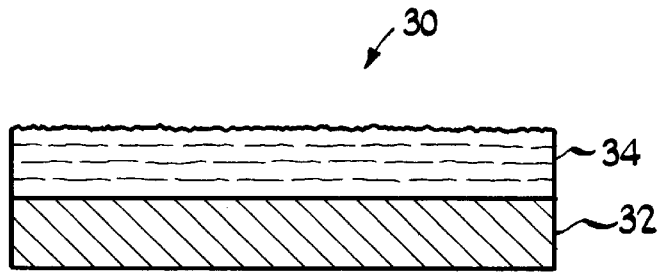

Electrode 30 of the present invention is shown in FIG. 3 as comprising current collector 32 and electrode layer 34. As will be understood to those with ordinary skill in the art, the electrode can comprise a cathode or anode, and current collector 32 may comprise any one of a number of conventional materials. Electrode layer 34 may include electrochemically active particles such as, $LiCoO_2$, $LiNiO_2$, and $LiMn_2O_4$—although other conventionally known transition metal oxides and mixed metal oxide are likewise contemplated for use. While not shown, electrode layer 34 may also include a polymerized or gelled electrolyte, such as, but not limited to, polyethylene oxide. Electrode layer 34 may also include other components, such as conductivity enhancing particles (e.g. carbon black, graphite).

Figure 4:
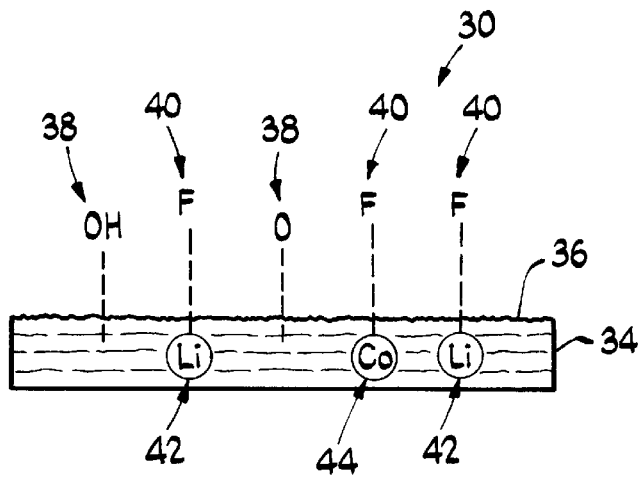
Figure 5:
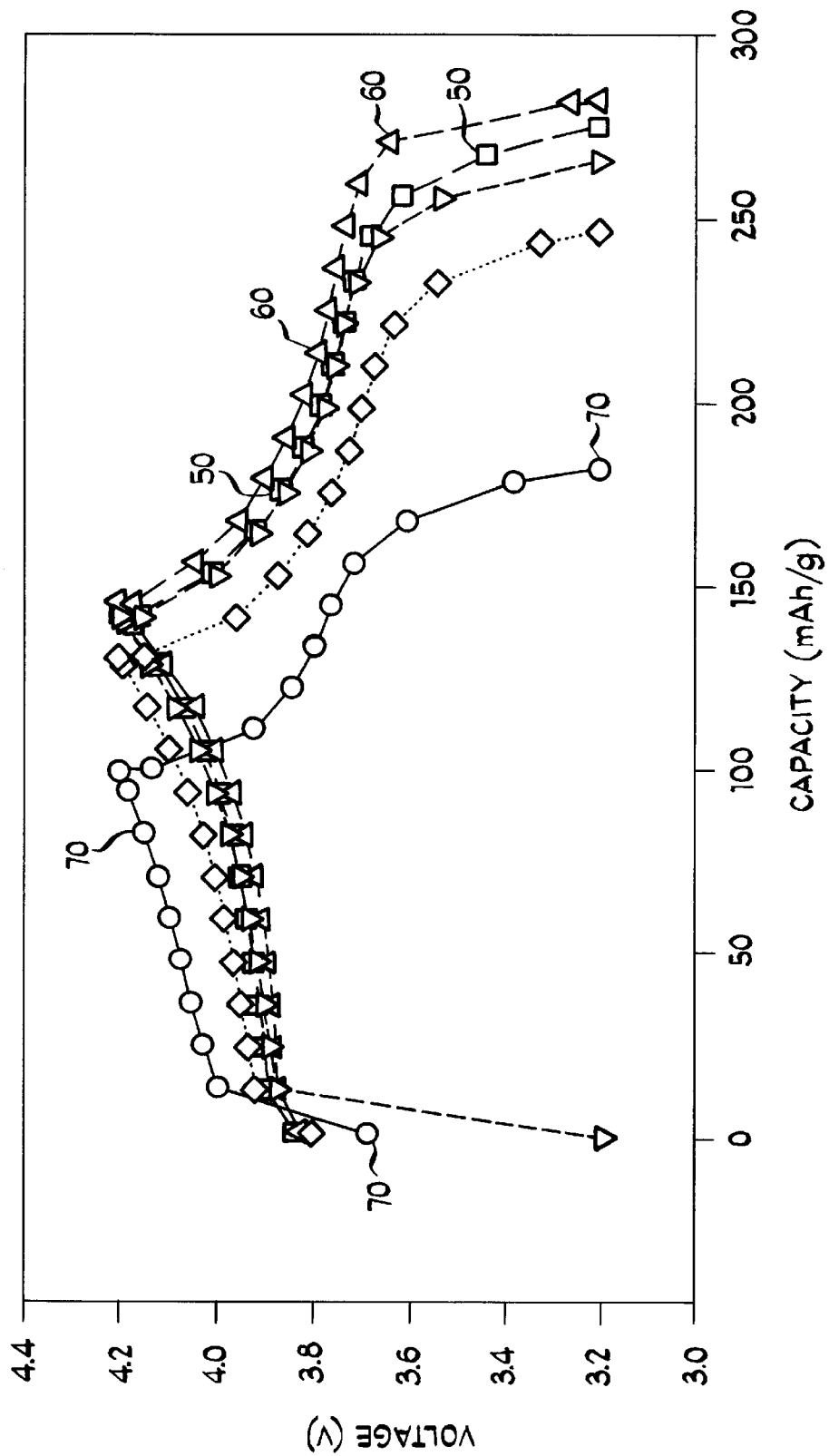
Figure 6:
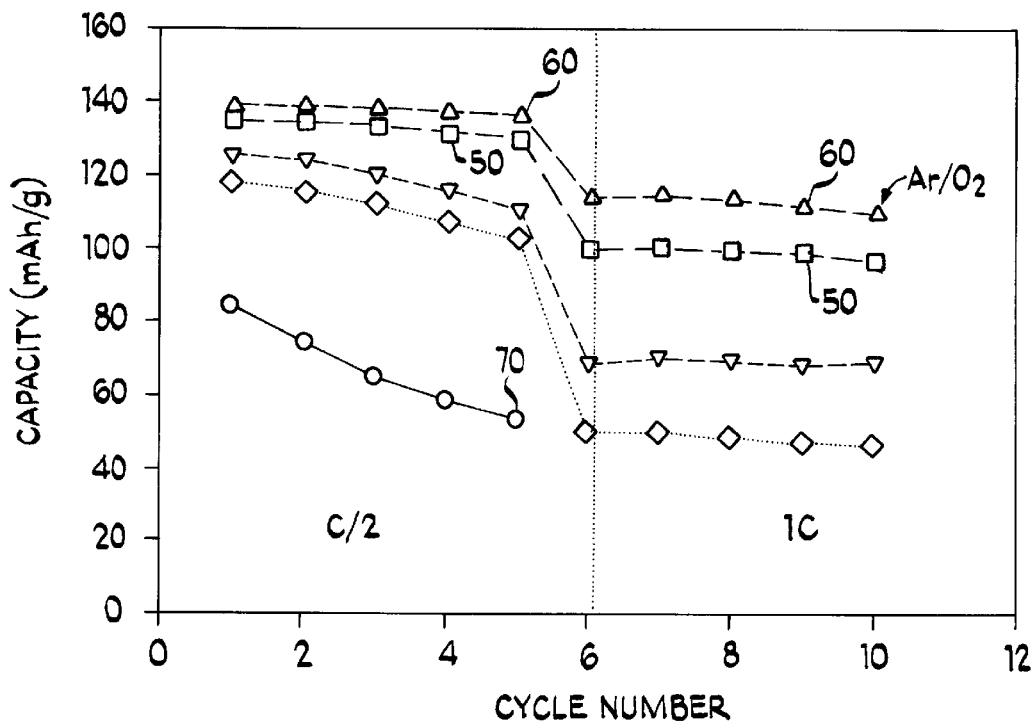
Figure 7:
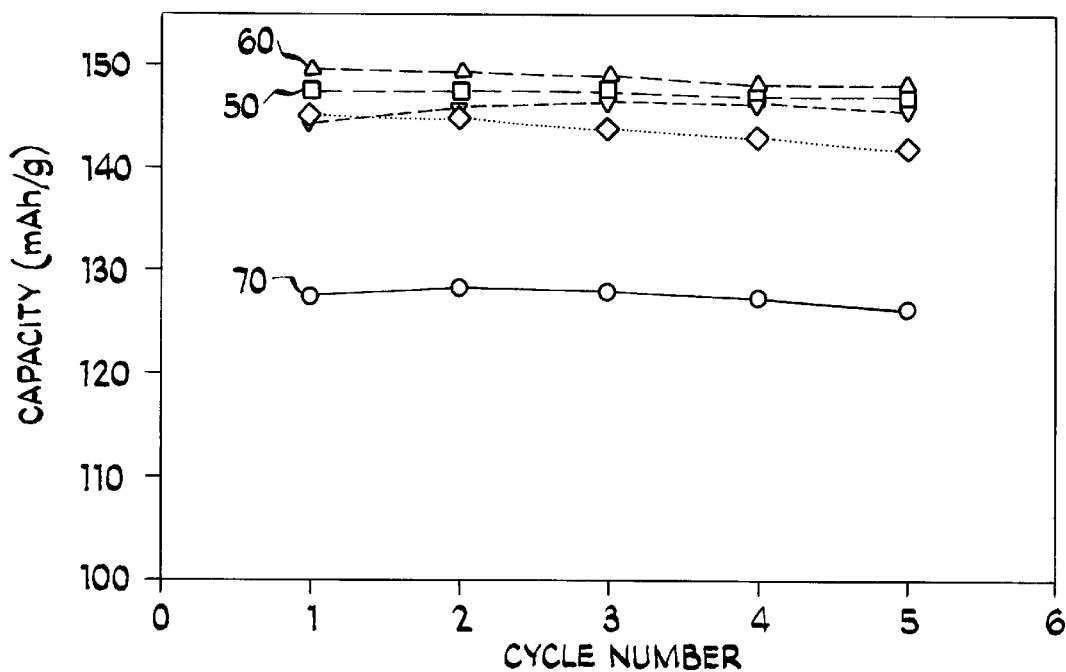

As shown in FIG. 4, Electrode layer 34 includes surface 36, atomic/molecular species 38, and fluoridated species 40. Both atomic/molecular species 38 and fluoridated species 40 extend contiguously from surface 36. Fluoridated species 40 are inorganically associated with lithium cations 42 and transition metal cations 44. Here within, the term "inorganic" is meant to describe a fluoridated species directly associated with a metal, rather than, among other things, a carbon source. For illustrative purposes only, transition metal cations 44 comprise cobalt, however, any one of a number of conventional transition metal (or d-block) cations are likewise contemplated for use. As will be discussed in detail below, electrodes having such fluoridated surfaces have exhibited increased stability, capacity, and rate capacities of an associated cell. While FIG. 4 discloses fluoridating electrode active materials to, in turn, create a surface phenomenon, it is also contemplated that both the surface and bulk morphology of the electrode active material be inorganically associated with a fluoridated species.

As will be discussed in greater detail below, fluoridated species 40 may be derived from an organic fluoropolymer precursor, which may be subsequently degradated via plasma treatment. Such a fluoropolymer may comprise tetrafluoropolyethylene, which is represented by the following polymeric structure:

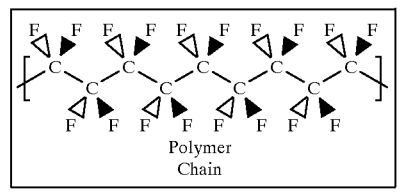

Of course, any organo-fluorine source, such as FEP, freon etc., as would be understood to those having ordinary skill in the art are likewise contemplated for use—including diatomic fluorine gas itself. Moreover, while fluorinated species have been disclosed in accordance with the present invention, the scope of the invention also recognizes other chemical species having similar functionalization as fluoridated species.

PLASMA INDUCED FLUORIDATION

In support of this invention two experiments were carried out. In the first experiment, the following experimental procedure was followed. First, a rotating plasma reactor, equipped with gas flow controllers, was charged with $LiCoO_2$ and fluorinated ethylene-propylene co-polymer or FEP-polymer. Second, the $LiCoO_2$ and fluorinated ethylene propylene polymer were dried under vacuum while the plasma reactor was rotated at approximately ten revolutions per minute. Third, the air within the chamber of the plasma reactor was removed/replaced via five purge/evacuation cycles with argon. Fourth, gas flow of argon and oxygen was initiated into the plasma reactor with respective flow rates of 1.8 and 1.9 milliliters per minute. Fifth, a system vacuum of 160 milli-torr was maintained and plasma generation was initiated at a nominal power of 100 watts (as well as at 200 watts for 30 min.). At step five in the experiment, the fluorinated ethylene polymer is believed to be at least partially decomposed and the fluorine species is allowed to associate with the surface of the $LiCoO_2$. The plasma generation ran for two hours at 100 watts. Sixth, plasma treatment was terminated and the reactor was purged with argon until ambient temperature and pressure was obtained. The fluoridated $LiCoO_2$ sample was removed and evaluated for stability, capacity, rate capacity, and bulk morphology characterization. Although specific parameters, such as flow rates, time and power have been identified, it should be understood that such parameters can be altered with similar results.

In the second experiment the same procedure was followed except that argon (without oxygen) was used. Characterization results of these experiments will be discussed below.

CHARACTERIZATION RESULTS

In support of the present invention, stability, capacity and rate capacity of each sample from the aforementioned experiments was determined using the following procedure.

First, the fluoridated transition metal oxide was mixed into a paste by addition of a binder (PVDF) and carbon black. Second, the electrode paste was pressed onto an aluminum mesh. Third, a three electrode cell (a new cell was constructed for each of the samples) was then constructed, wherein the electrode with the fluoridated electrode active material served as the working electrode. The counter electrode and reference electrode were both constructed from lithium. The electrolyte used in each of the cells, and, in turn, in each of the experiments comprised a one molar solution of $LiAsF_6$ dissolved in propylene carbonate. The capacities of each fully constructed cell was then determined by repetitively cycling the cell between 3.2 and 4.2 volts. A tabulated summary of the data collected is provided below.

| Modification Method | Capacity for C/4 rate (mAh/g) | Capacity for C/2 rate (mAh/g) | Capacity for C rate (mAh/g) |
|---|---|---|---|
| Unmodified | 128 (slow decay) | 84 (fast decay) | 0 |
| Plasma Fluoridation ($Ar/O_2$) | 149 (stable) | 139 (stable) | 115 (stable) |
| Fluoridation (Ar) | 147 (stable) | 136 (stable) | 100 (stable) |

As evident from the summary table above, each of the disclosed treatments resulted in a substantial increase in capacity of the fluoridated electrode relative to the untreated reference electrode. Moreover, the thermal stability of each fluoridated electrode active material was dramatically enhanced compared to the untreated electrode—especially during faster C and C/2 charge/discharge cycles.

As shown in FIG. No. 5, the characterization data for plasma fluoridated $LiCoO_2$ (C/2 rate), indeed confirms that the fluoridated electrode material (squares 50 represent argon plasma fluoridated $LiCoO_2$; triangles 60 represent argon/oxygen plasma fluoridated $LiCoO_2$) exhibits an increase in rate capacity, as compared to untreated material (circles 70).

Similarly, FIGS. No. 6–7 show that the plasma induced fluoridated electrode materials exhibit increased capacity at C/1, C/2 and C/4 rates, respectively.

In further support of the present invention x-ray diffraction traces were performed to verify that, indeed, the bulk morphology of the fluoridated electrode active material remained unchanged. As shown in FIGS. No. 8, the x-ray diffraction trace of the unmodified electrode active material was identical to the traces of the plasma induced fluorinated electrode active material. In particular, peak position and peak intensity remained unchanged. As can be seen, no peak shifts were observed in the fluoridated sample. As shown in FIG. 9, X-ray photo spectroscopy was used to quantitatively verify that, indeed, the surface of the electrode active material is substantially fluoridated (e.g. ≈10%). Moreover, associated bond energies confirm that the fluorine source has changed from an organic to an inorganic configuration. Accordingly, the aforementioned experiments verify that stability, capacity, and rate capacity of an electrolytic cell can be increased by fluoridating the surface of the electrode active material. Of course, the bulk morphology may also be fluoridated to enhance electrochemical performance as well.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A process for fluridating at least a portion of at least one surface of an electrode active material for use in an electrochemical cell comprising the steps of:

positioning at least a portion of the electrode active material having at least one surface into a chamber;

introducing at least one of an organo-fluorinated or fluorine gas precurser into the chamber; and associating at least a portion of the at lest one surface of the electrode active material with the introduced at least one precurser to, in turn, increase at least one of stability, capacity and rate capacity of the electrode active material.

2. The process according to claim 1, wherein the step of associating includes exposing at least a portion of the at least one surface of the electrode active material and the at least one precurser to plasma treatment.

3. The process according to claim 2, wherein the plasma treatment occurs in an inert control atmosphere.

4. The process according to claim 2, wherein plasma treatment occurs in a combination atmosphere of at least one non-inert gas and at least one inert gas.

5. The process according to claim 1, wherein the electrode active material is selected from the group of transition metal oxides and lithium transition metal oxides.

6. The process according to claim 5, wherein the lithium transition metal oxides are selected from at least one of the group of $LiCoO_2$, $LiNiO_2$, $LiMn_2O_4$, and $LiCo_xNi_yO_2$ where $x+y=1$.

7. The process according to claim 1, wherein the precurser includes a polymer.

8. A process for fluoridating at least a portion of at least one surface of an electrode active material for use in an electrochemical cell comprising the steps of:

positioning at least a portion of the electrode active material having at least one surface into a chamber associated with a plasma generator;

introducing at least one of an organo-fluorinated or fluorine gas precurser into said chamber;

activating the plasma generator;

controllably decomposing at least a portion of the precurser; and inorganically associating at least a portion of the decomposed precurser with at least a portion of the at least one surface of the electrode active material to, in turn, increase at least one of stability, capacity and rate capacity of the electrode active material.

9. The process according to claim 8, wherein the precurser includes a polymer.

* * * * *